Aug. 22, 1933.  H. W. HOCKLEY  1,924,039
ELECTRICAL MEASURING INSTRUMENT
Filed Dec. 7, 1932   2 Sheets-Sheet 1
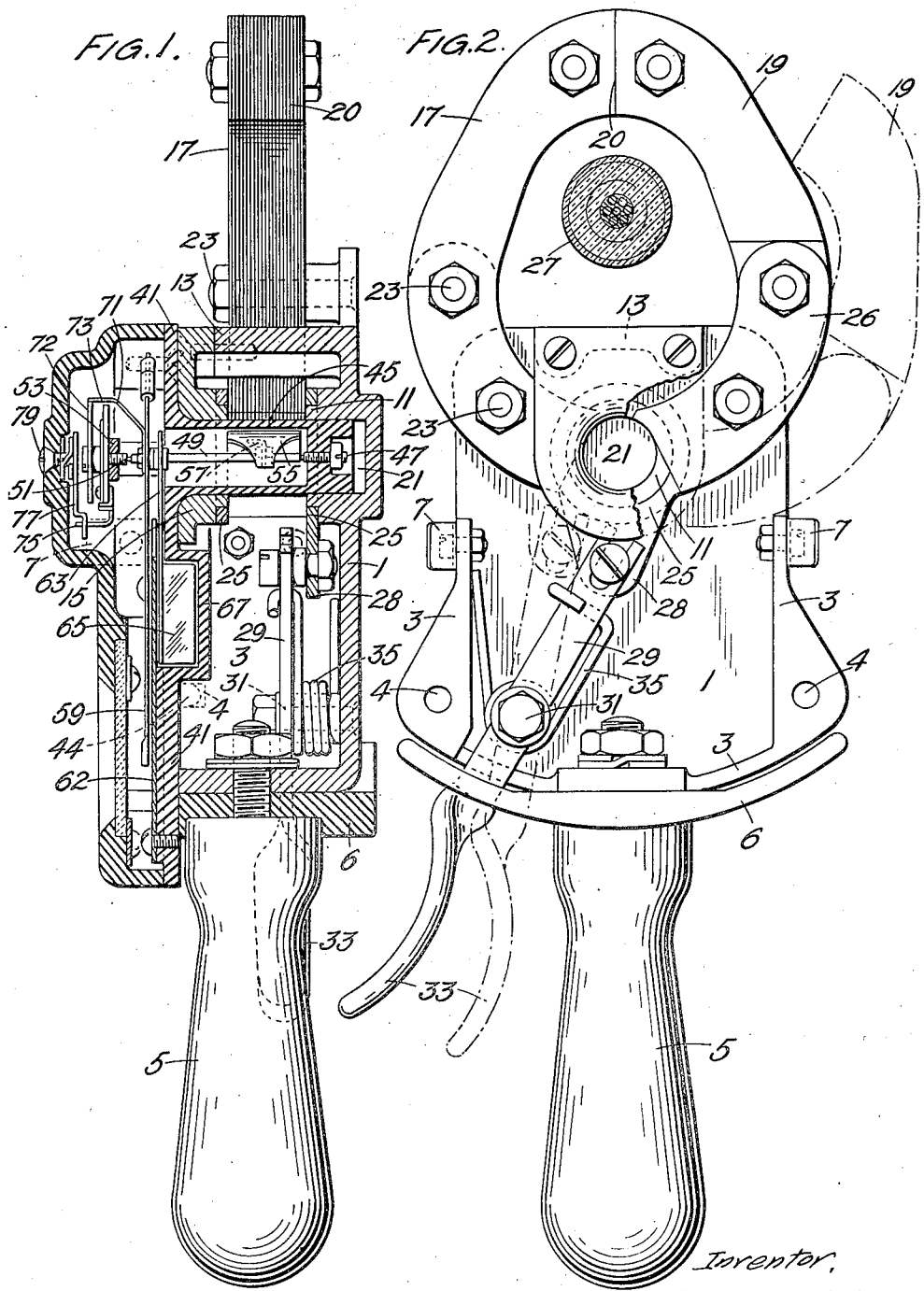

Aug. 22, 1933.  H. W. HOCKLEY  1,924,039
ELECTRICAL MEASURING INSTRUMENT
Filed Dec. 7, 1932    2 Sheets-Sheet 2
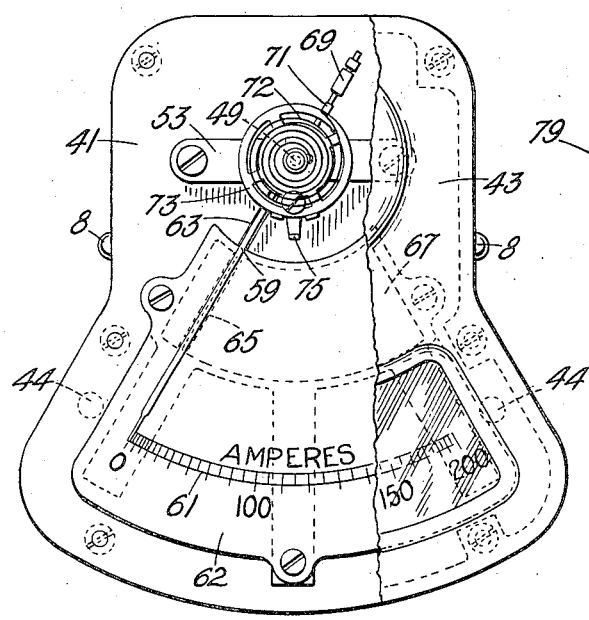
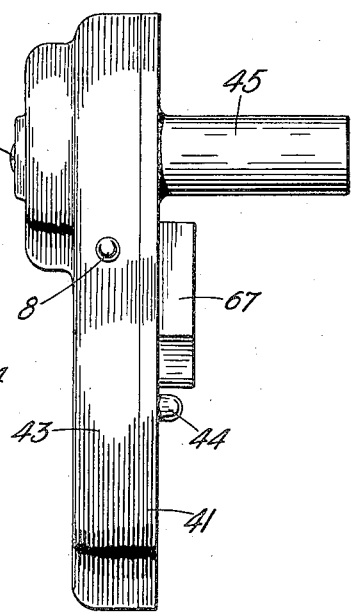

Patented Aug. 22, 1933

1,924,039

UNITED STATES PATENT OFFICE 1,924,039

ELECTRICAL MEASURING INSTRUMENT

Harold William Hockley, Chelmsford, England, assignor to Crompton Parkinson Limited, Chelmsford, England, a registered company of Great Britain Application December 7, 1932. Serial No. 646,175

5 Claims. (Cl. 171—95)

The present invention concerns improvements in or relating to electrical measuring instruments of the kind known as moving iron instruments.

It has been proposed to provide a moving iron instrument which is actuated direct by the current passing in a conductor the current in which is to be measured, and which is constructed with an iron ring or collar having in it a gap in which is pivoted the moving iron member that actuates the pointer of the instrument, the pivoted axis of the said member being within the said gap and at right angles to the flux; the iron ring might be divided and hinged so that the gap could open sufficiently to admit the said conductor within the ring.

One advantage of an instrument of the type just described is that it can embrace a conductor and that there are only two breaks necessary in the iron of the magnetic circuit, one of these being the gap in which the moving iron member is located.

An instrument of this type has been found effective both in connection with the measurement of direct and alternating current, and the main object of the present invention is to make it still more widely useful by increasing the ease with which it can be caused to embrace the conductor the current in which is to be measured and by making it readily adaptable to a plurality of ranges.

One construction illustrative of the invention will now be described in conjunction with the accompanying diagrammatic drawings.

In the drawings,

Fig. 1 is a central section of the complete instrument;

Fig. 2 is a front view of the instrument with the movement unit removed;

Fig. 3 is a front view of the movement unit with its cover partly broken away; and Fig. 4 is a side view of the movement unit.

The instrument about to be described comprises two readily separable units, a magnet unit (Fig. 2) and a movement unit (Figs. 3 and 4); the two units are held together by clips on the magnet unit.

The magnet unit comprises a base 1 (of die-cast aluminum alloy) having an upstanding wall 3 to which is fixed at one end of the base (herein referred to as the rear end for convenience of description) a handle 5 and a "bakelite" shield 6. The wall 3 carries at each side an upstanding spring clip 7. Projecting from the base 1 near its front end is a circular hollow boss 11; at the front of the base 1 is an upstanding bracket 13 having at right angles thereto a flange which carries a projecting circular hollow boss 15 oppositely placed to the boss 11.

A ring or collar magnet is composed of two parts 17 and 19, normally positioned with the butt joint 20 and with a shaped gap 21 for the reception of the moving iron element of the movement unit. The part 17 is fixed to the base 1 by bolts 23; the part 19 is mounted for pivotal movement on the bosses 11 and 15 by means of brass collars 25 each of which embraces a boss and each of which has a forwardly-extending horn 26 that is bolted to the part 19. In order to move the part 19 to open a gap at the butt joint 20 to permit a conductor as 27 to be embraced by the magnet, the lower collar 25 has a lug 28 which is connected by a pin-and-slot connection with one end of a lever 29 pivoted at 31 to the base 1 and having a trigger 33 adjacent the handle 5. The magnet part 19 is normally kept closed by a spring 35.

The rear ends of the magnet parts 17 and 19 are curved so as to make the gap 21 co-axial with the interior of the circular bosses 11 and 15 for the joint reception of the moving iron member of the movement unit.

It will be understood that both parts of the magnet might be made movable; also that the magnet may instead of being pear-shaped as shown be of any other convenient shape, for example, approximately rectangular.

The movement unit will now be described. A "bakelite" plate 41 carries the parts of the movement; to the plate 41 a cover 43 is attached by screws. When the unit is put in place on the magnet unit the cover is gripped by the clips 7, ribs 8 being provided on the sides of the cover to facilitate this. The bottom of the plate 41 has moulded integrally with it two dowel pins as 44 adapted to enter corresponding holes 4 in the top of the wall 3 to locate the movement unit relatively to the magnet unit.

Formed integral with the plate 41 is a tube 45 closed at its bottom and there provided with an adjustable bearing 47 which supports a spindle 49 the upper end of which is carried by a bearing 51 mounted in a bar 53 fixed to the plate 41. The moving iron is in the form of a truncated triangle of iron 55 wound round the spindle 49 and fixed thereto by a brass bracket 57. Near its upper end the spindle has fixed to it a pointer 59 (moving over a scale 61 on a scale-plate 62) and an arm 63 carrying a damping vane 65 that moves in a damping chamber 67 formed integral with the plate 41. The spindle 49 also carries adjustable balance weights 69.

Fixed to the spindle 49 is one end of a yoke 71, the other end of which is attached to one end of a spiral spring 72 that is carried by a wheel 73 frictionally held to the bar 53. The wheel has adjustably fixed to it a finger 75 that engages in a slot in an arm 77 fixed to the bottom of a screw 79 mounted in the cover; by rotating the screw and so the wheel the effect of the spring 72 can be adjusted from the outside of the cover.

The movement unit is placed on the magnet unit with its tube 45 within and co-axial with the gap 21 in the magnet. A series of movement units differently calibrated may be supplied with one magnet unit and any one may be used simply by substitution, so that the instrument is a multi-range instrument without the use of different windings, a transformer, or means for varying the gap.

Such a construction is extremely convenient in that a current-carrying conductor may be readily embraced by opening the jaws of the magnet at the front, and at the same time (since the gap in the magnet is co-axial with the moving iron member) the number of breaks in the magnet iron is a minimum. Furthermore, there are few parts (none of them windings), and those that are moved in use can be made comparatively strong; the parts are simple and easily accessible so that if necessary they can be easily replaced. The whole support and casing for the movement (except the cover) is combined in a single "bakelite" moulded element.

In operation all that is required is that a suitable movement unit should be selected and placed on the magnet unit, and that the magnet should be opened by means of the handle and trigger and caused to embrace the conductor. Current in the conductor is at once indicated by movement of the pointer over the scale. The instrument is operable by one hand.

As the effect on the instrument is proportional to the number of ampere-turns within the magnet, the conductor may in certain circumstances be coiled and the magnet caused to embrace the coils; this will in effect reduce the calibration of the scale proportionately to the number of coils.

What I claim is:—

1. A moving-iron electrical measuring instrument which is actuated directly by current passing in a conductor, having in combination a self-contained magnet unit and a movement unit designed to be interchangeable with other units of like construction but of different calibration characteristics, the magnet unit comprising a base, a magnet in the form of a split iron collar divided into only two parts, which parts are permanently separated at one of the division locations by a gap for the reception of the moving iron element of the movement unit and are mounted on the base to open by a movement about an axis within the gap and transverse to the general plane of the magnet, and each movement unit comprising a moving iron element that is adapted to be received within the magnet gap.

2. A moving-iron electrical measuring instrument which is actuated directly by current passing in a conductor, having in combination a self-contained magnet unit and a self-contained movement unit, the magnet unit comprising a base, a magnet in the form of an iron collar divided at opposite locations into only two parts, which parts are permanently separated at one of the said locations by a gap for the reception of the moving iron element of the movement unit and are mounted to open by a movement about an axis within the gap and transverse to the general plane of the magnet, and spring means normally to press the magnet parts about their axis to close them together at the division location opposite the gap, and the movement unit comprising a moving iron element that is adapted to be received within the magnet gap.

3. A moving-iron electrical measuring instrument which is actuated directly by current passing in a conductor, having in combination a self-contained magnet unit and a self-contained movement unit, the magnet unit comprising a base, a magnet in the form of an iron collar divided at opposite locations into only two parts which are permanently separated at one of the said locations by a gap for the reception of the moving iron element of the movement unit and the one of such parts is fixed to the base and the other of such parts is mounted to open by a movement about an axis within the gap and transverse to the general plane of the magnet, spring means normally to press the magnet parts about their axis to close them together at the division location opposite the gap, a handle and a finger trigger which is connected to the movable magnet part so that closing of the trigger towards the handle will cause the movable part to open the magnet to embrace a conductor, and the movement unit comprising a movable iron element that is adapted to be received within the magnet gap.

4. A moving iron electrical measuring instrument actuated directly by current passing in a conductor, having its only magnet in the form of a two-section collar, having a permanent gap between one pair of ends of the sections for the reception of the moving iron element, and having means pivoting the two sections for movement about an axis passing through the said gap transversely to the general plane of the magnet so that the other pair of ends of the sections remote from the said gap may be opened and closed for the admission and removal of the conductor the current in which is to be measured.

5. A moving iron electrical measuring instrument actuated directly by current passing in a conductor, having its only magnet in the form of a two-section collar, having a permanent gap between one pair of ends of the sections for the reception of the moving iron element, having means pivoting the two sections for movement about an axis passing through the said gap transversely to the general plane of the magnet so that the other pair of ends of the sections remote from the said gap may be opened and closed for the admission and removal of the conductor the current in which is to be measured, having spring means normally to press the said other pair of ends towards one another, and having a hand-operated lever to cause opening of the sections at their ends remote from the said gap.

HAROLD WILLIAM HOCKLEY.